(12) United States Patent
Managi (10) Patent No.: US 11,220,242 B2
(45) Date of Patent: Jan. 11, 2022

(54) WINDSHIELD WIPER ARM

(71) Applicant: MITSUBA Corporation, Gunma (JP)

(72) Inventor: Nobukazu Managi, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 16/962,513

(22) PCT Filed: Feb. 22, 2019

(86) PCT No.: PCT/JP2019/006761
§ 371 (c)(1),
(2) Date: Jul. 16, 2020

(87) PCT Pub. No.: WO2019/167828
PCT Pub. Date: Sep. 6, 2019

(65) Prior Publication Data
US 2020/0346623 A1    Nov. 5, 2020

(30) Foreign Application Priority Data
Mar. 2, 2018  (JP) .............................. JP2018-037875

(51) Int. Cl.
*B60S 1/52*  (2006.01)
(52) U.S. Cl.
CPC ..................... *B60S 1/522* (2013.01)
(58) Field of Classification Search
CPC ..................................................... B60S 1/522
See application file for complete search history.

(56) References Cited

U.S. PATENT DOCUMENTS 3,940,068 A    2/1976  Mohnach et al.
2007/0018012 A1*  1/2007  Harris .................... B29C 45/261
                                                         239/284.1

FOREIGN PATENT DOCUMENTS

EP    3031677    6/2016
FR    2286735    4/1976
JP    S6366367   5/1988

(Continued)

OTHER PUBLICATIONS

"Written Opinion of the International Searching Authority (Form PCT/ISA/237) of PCT/JP2019/006761," dated Apr. 2, 2019, with English translation thereof, pp. 1-11.

(Continued)

*Primary Examiner* — Andrew A Horton
(74) *Attorney, Agent, or Firm* — JCIPRNET (57) ABSTRACT

A windshield wiper arm includes: an arm piece to which a wiper blade wiping a wiping surface is connected; a hose supplied with washer fluid; and a washer nozzle connected to the hose and mounted on the arm piece on the base end side with respect to a portion connected to the wiper blade. The washer nozzle includes: a first flowpath extending in a longitudinal direction; a second flowpath connected to the first flowpath and extending in a wiping direction which intersects the longitudinal direction, and in which the wiper blade can move when wiping the wiping surface; a third flowpath connected to the second flowpath and extending in a vertical direction which is along a normal line of the wiping surface while intersecting the longitudinal direction and the wiping direction; and a fitting groove into which the arm piece is fitted and which extends along the longitudinal direction.

6 Claims, 12 Drawing Sheets

(56) References Cited

FOREIGN PATENT DOCUMENTS

| | | |
|---|---|---|
| JP | 2012158263 | 8/2012 |
| JP | 2016155420 | 9/2016 |
| JP | 2017077865 | 4/2017 |
| KR | 20020030312 | 4/2002 |
| NL | 7311701 | 2/1974 |

OTHER PUBLICATIONS

"International Search Report (Form PCT/ISA/210) of PCT/JP2019/006761", dated Apr. 2, 2019, with English translation thereof, pp. 1-2.

"Search Report of Europe Counterpart Application", dated Oct. 18, 2021, pp. 1-6.

* cited by examiner

WINDSHIELD WIPER ARM

CROSS-REFERENCE TO RELATED APPLICATION

This application is a 371 application of the International PCT application serial no. PCT/JP2019/006761, filed on Feb. 22, 2019, which claims the priority benefits of Japan Patent Application No. 2018-037875, filed on Mar. 2, 2018. The entirety of each of the above-mentioned patent applications is hereby incorporated by reference herein and made a part of this specification.

BACKGROUND

Technical Field

The invention relates to a windshield wiper arm.

Description of Related Art

A conventional windshield wiper arm as shown in the following Patent Document 1 is known. In the windshield wiper arm, a washer nozzle for spraying a washer fluid is mounted on an arm piece to which a wiper blade is connected. In order to spray the washer fluid near the wiper blade on a wiping surface wiped by the wiper blade, the positions of a spray port of the washer nozzle and the arm piece are arranged to be shifted in a width direction in which the wiper blade can move when wiping the wiping surface.

RELATED ART

Patent Document

[Patent Document 1] Japanese Laid-Open No. 2017-077865

SUMMARY

Problems to be Solved

However, in the conventional windshield wiper arm, a hose connected to the washer nozzle is arranged to be shifted in the width direction with respect to the windshield wiper arm in accordance with the position of the spray port of the washer nozzle. Therefore, the entire windshield wiper arm becomes bulky in the width direction, and the appearance of the windshield wiper arm is impaired.

In view of the above-mentioned circumstances, the invention provides a windshield wiper arm that prevents the entire windshield wiper arm from becoming bulky in the width direction and improves the appearance.

Means for Solving the Problems

In view of the above, a windshield wiper arm according to the invention includes: an arm piece to which a wiper blade is connected and which extends in a first direction; a hose to which a washer fluid is supplied and which is arranged along the arm piece; and a washer nozzle which is connected to the hose and mounted on the arm piece on a base end side with respect to a portion connected to the wiper blade. The washer nozzle includes: a first flowpath which extends in the first direction; a second flowpath which is connected to the first flowpath and extends in a second direction, which intersects the first direction and in which the wiper blade is movable when wiping a wiping surface; a third flowpath which is connected to the second flowpath and extends in a third direction, which intersects the first direction and the second direction respectively and is orthogonal to the wiping surface; and a fitting groove into which the arm piece is fitted and which extends along the first direction.

As described above, in the above-described configuration, the first flowpath, the second flowpath, and the third flowpath are formed in the washer nozzle, and these flowpaths as a whole extend three-dimensionally. Further, the fitting groove which extends in the same direction as the first flowpath and into which the arm piece is fitted is formed in the washer nozzle. Therefore, when the arm piece is fitted into the fitting groove, it is possible to arrange the hose connected to the washer nozzle to overlap with respect to the arm piece in the second direction that intersects the first direction. Thus, the entire windshield wiper arm can be prevented from becoming bulky in the third direction that intersects the first direction and the second direction respectively, and the appearance can be improved.

The second flowpath may include a first opening that is open toward a side opposite to the third flowpath in the second direction. A closure cap may be mounted on the first opening. The third flowpath may include a second opening that is open toward a wiping surface side.

In this case, since the second flowpath includes the first opening, the second flowpath can be easily formed. Further, since the third flowpath includes the second opening, the third flowpath can be easily formed.

In addition, a recess which is recessed in the third direction may be formed on an inner surface of the fitting groove, and a protrusion which protrudes in the third direction and is fitted into the recess may be formed on an outer surface of the arm piece.

In this case, by fitting the protrusion formed on the outer surface of the arm piece into the recess formed on the inner surface of the fitting groove, the arm piece can be tightly fitted into the fitting groove.

Further, the washer nozzle may be formed by injection molding of a synthetic resin material, and the recess may be open in the first direction.

In this case, the washer nozzle can be easily formed at low cost. In addition, since the recess of the fitting groove is open in the first direction, by setting the pulling direction of a core mold to the first direction for forming the fitting groove, the recess can be easily formed on the inner surface of the fitting groove.

Effects

According to the invention, it is possible to prevent the entire windshield wiper arm from becoming bulky and improve the appearance.

DESCRIPTION OF THE EMBODIMENTS

Figure 1:
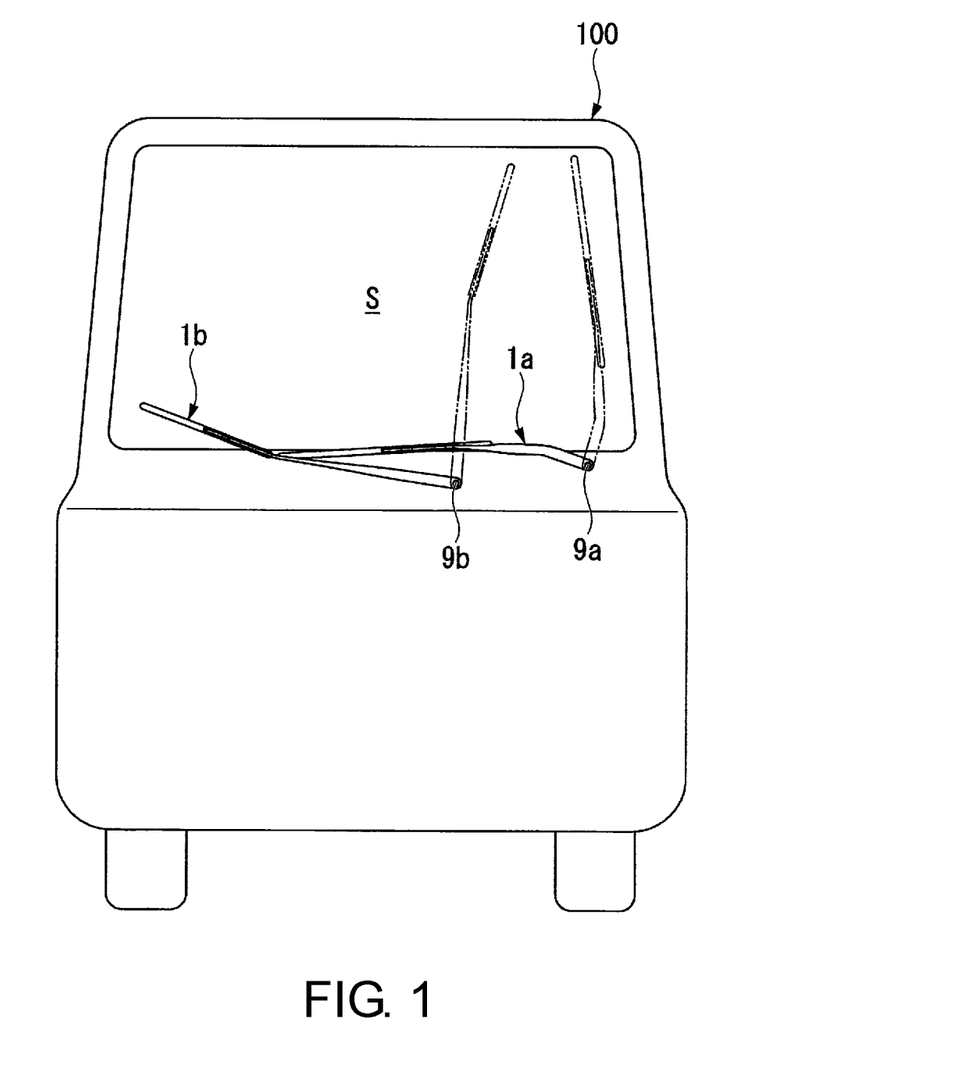
FIG. 1 is a front view of a vehicle equipped with a windshield wiper arm according to an embodiment of the invention.

Hereinafter, a windshield wiper arm 1 according to an embodiment of the invention will be described with reference to FIG. 1 to FIG. 14. As shown in FIG. 1, a vehicle body 100 is provided with pivot shafts 9a and 9b at two positions, a driver seat side (hereinafter referred to as DR side) and a passenger seat side (hereinafter referred to as AS side). A DR side windshield wiper arm 1a and an AS side windshield wiper arm 1b are mounted onto the pivot shafts 9a and 9b respectively.

Figure 2:
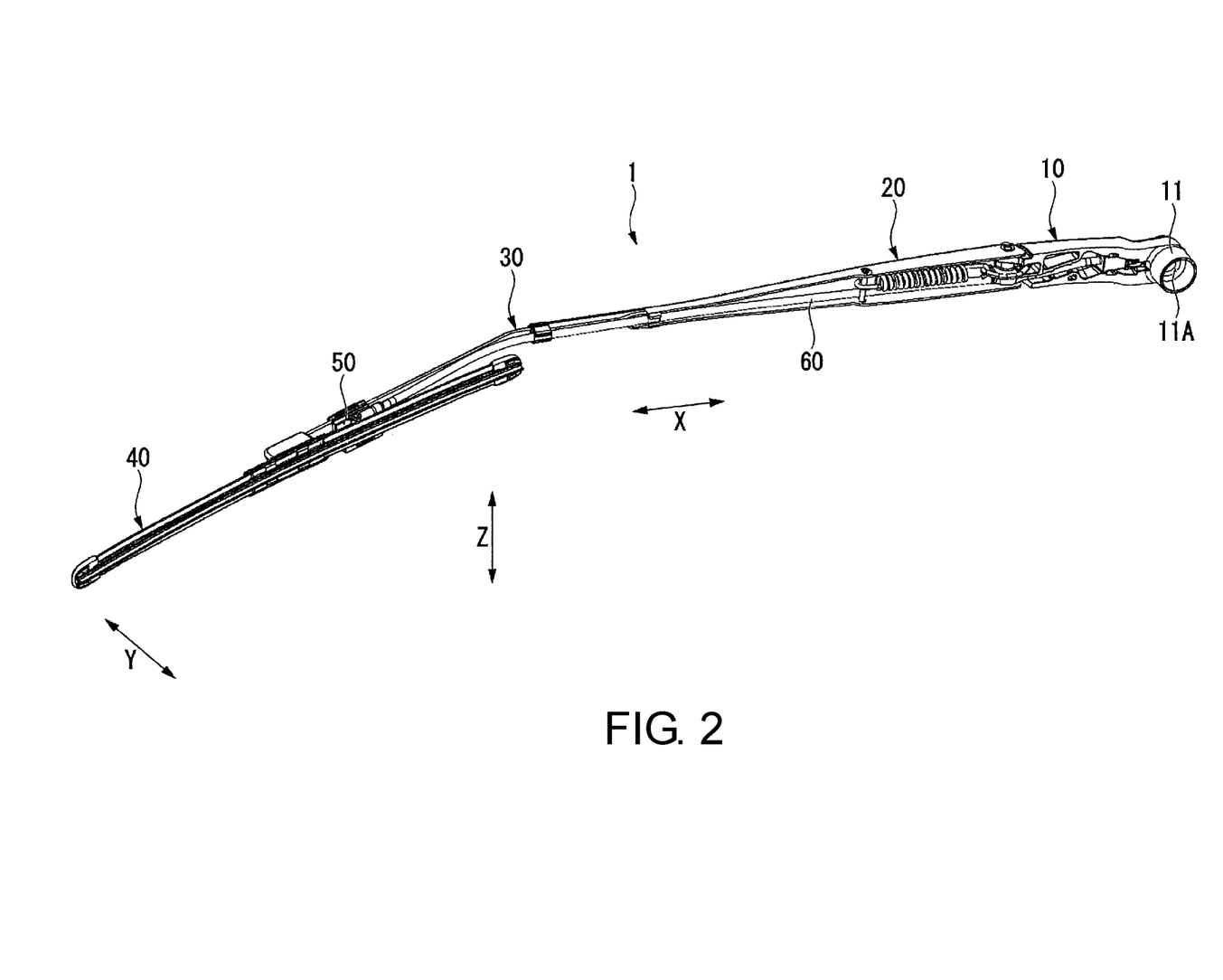
FIG. 2 is a perspective view of the windshield wiper arm shown in FIG. 1.
Figure 3:
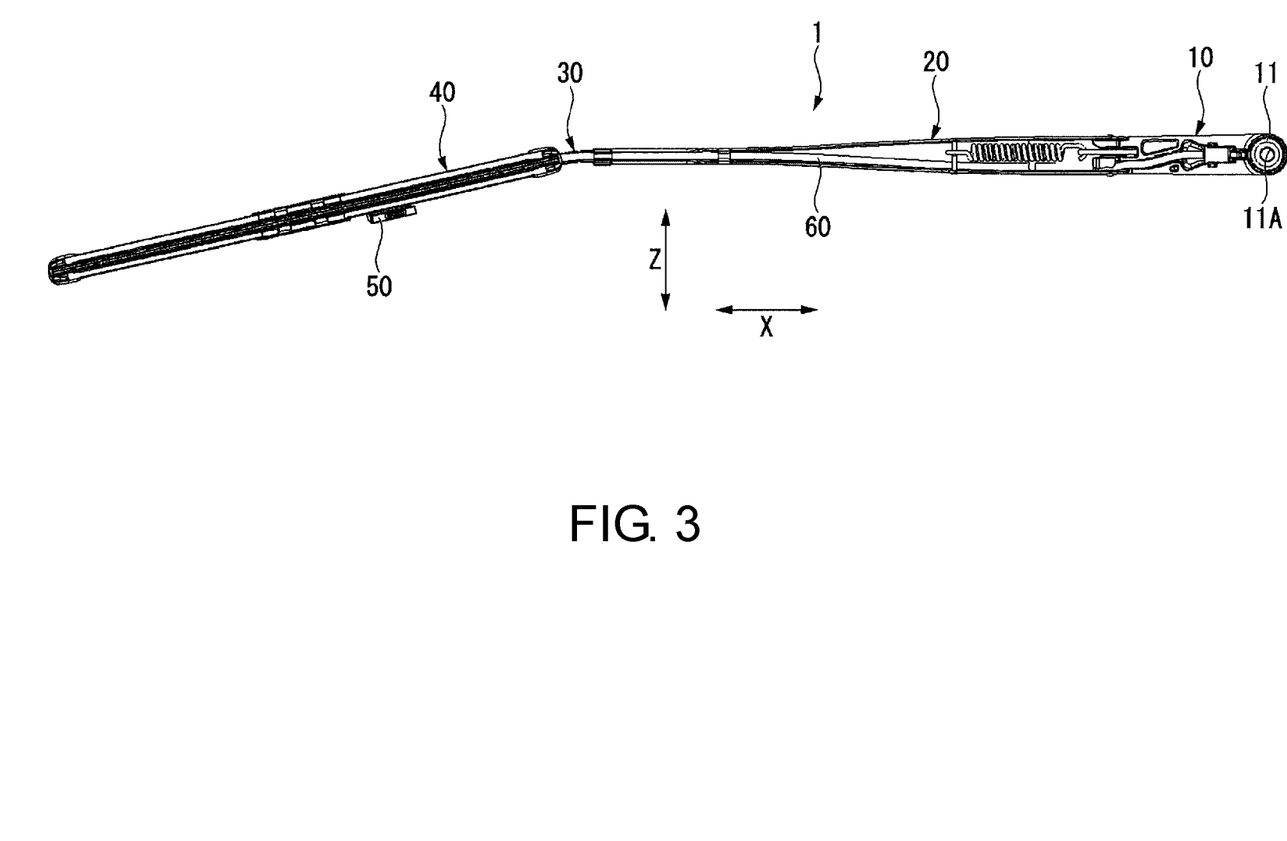
FIG. 3 is a rear view of the windshield wiper arm shown in FIG. 1.
Figure 4:
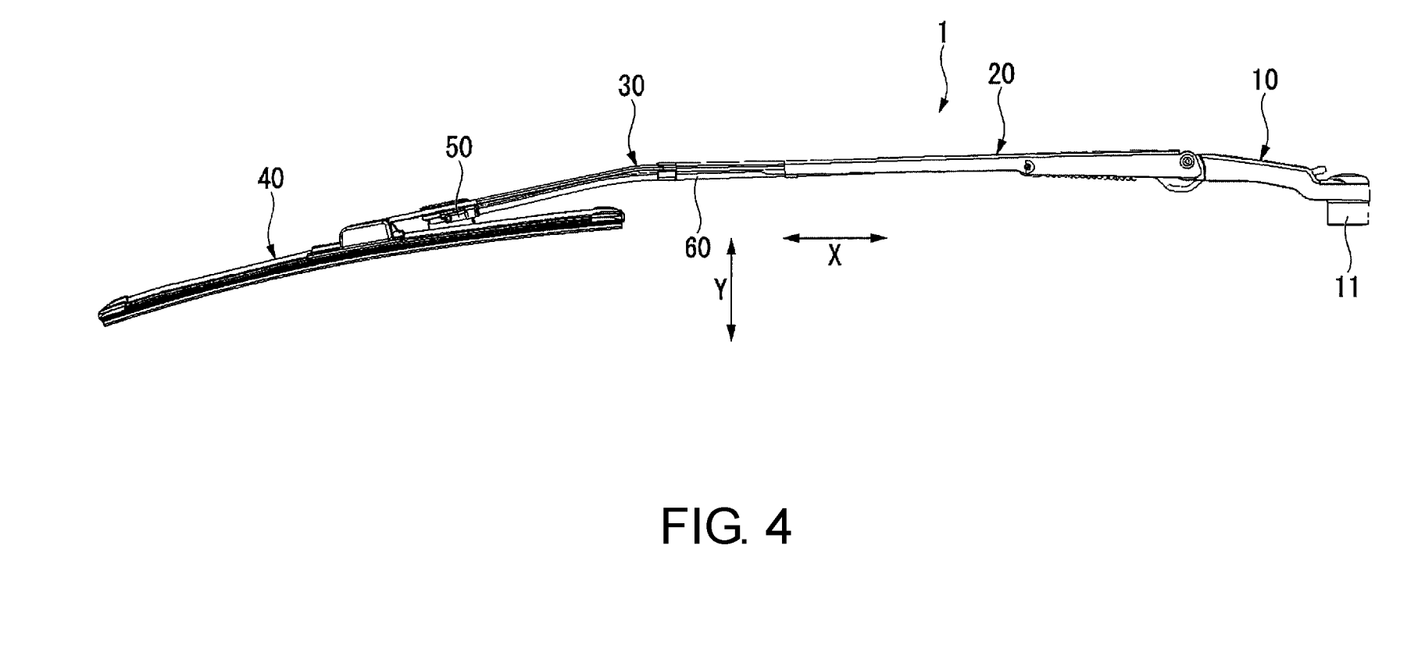
FIG. 4 is a plan view of the windshield wiper arm shown in FIG. 1.
Figure 5:
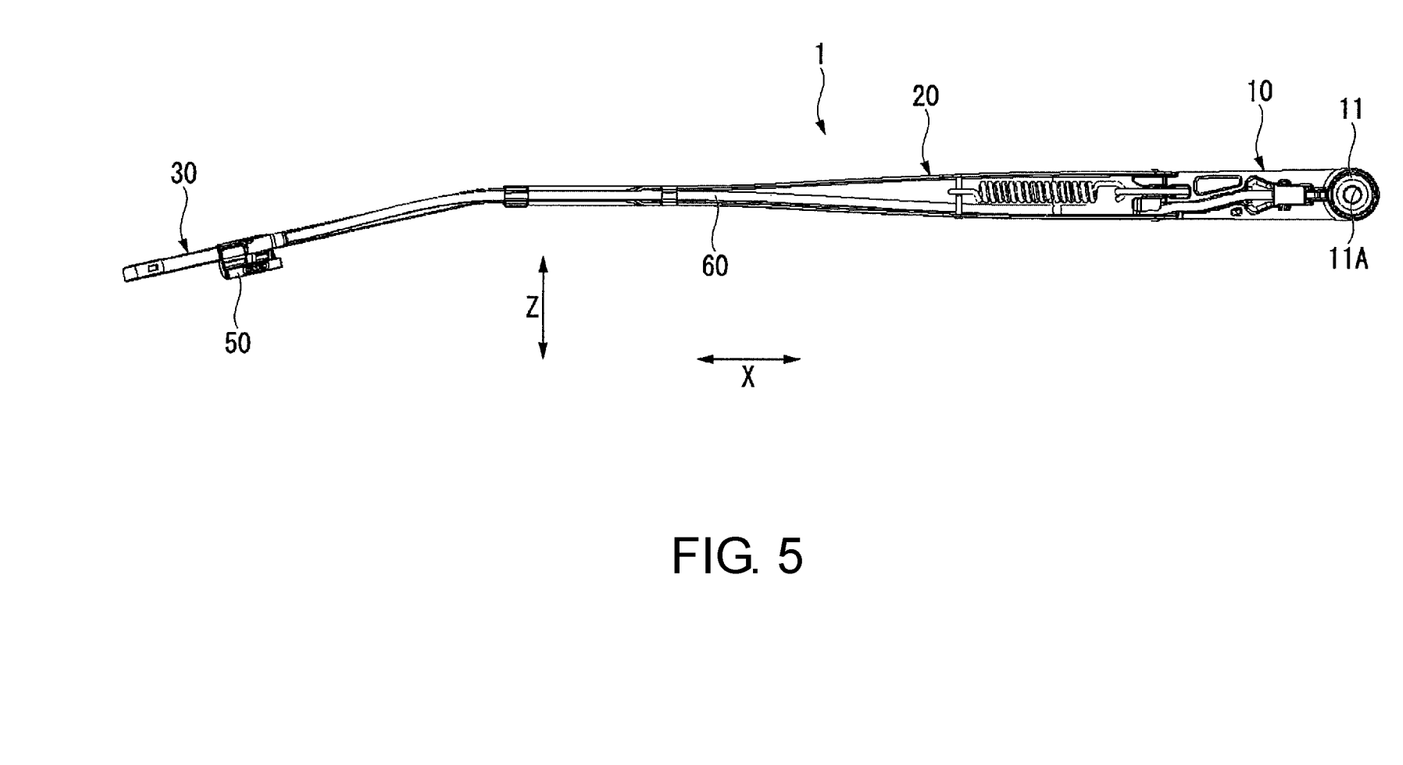
FIG. 5 is a view showing a state where a blade rubber is removed from the windshield wiper arm shown in FIG. 3.
Figure 6:
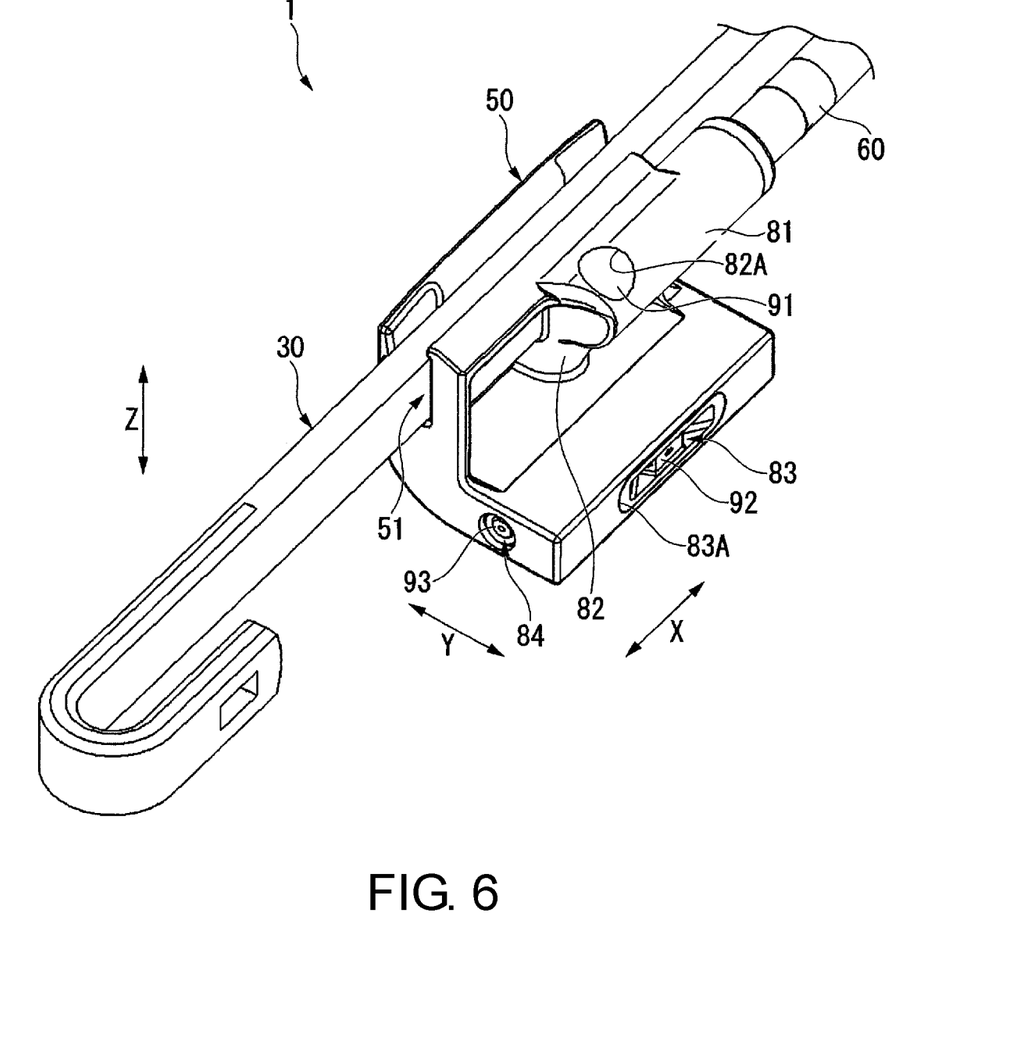
FIG. 6 is an enlarged view of a portion around a washer nozzle of the windshield wiper arm shown in FIG. 5.

FIG. 2 shows the AS side windshield wiper arm 1b. Since the DR side windshield wiper arm 1a and the AS side windshield wiper arm 1b have the same configuration, only the AS side windshield wiper arm 1b will be described hereinafter. Moreover, in the description of the AS side windshield wiper arm 1b, the components of the AS side windshield wiper arm will be described without "AS side" and will be simply referred to as "windshield wiper arm 1" and so on. The "a, b" at the ends of the reference numerals distinguished by the DR side and the AS side are omitted.

As shown in FIG. 1 to FIG. 5, the windshield wiper arm 1 according to the present embodiment includes an arm head 10 that is rotatable around the pivot shaft 9 provided on the vehicle body 100, and a shank 20 that is connected to the arm head 10. The arm head 10 and the shank 20 are formed in a long shape that extends in one direction. In the following description, the one direction is referred to as a longitudinal direction X (first direction).

The arm head 10 has a fastening part 11 having a fastening hole 11A into which the pivot shaft 9 is inserted. The fastening part 11 is provided at an end of the arm head 10 on one side in the longitudinal direction X. An end of the shank 20 on one side in the longitudinal direction X is connected to an end of the arm head 10 on the other side in the longitudinal direction X.

An arm piece 30 is fixed to an end of the shank 20 on the other side in longitudinal direction X. The arm piece 30 is formed in a long shape that extends in the longitudinal direction X. An end (base end) of the arm piece 30 on one side in the longitudinal direction X is fixed to the shank 20. In the example as shown, the arm piece 30 is fixed to the shank 20 by crimping the end of the shank 20 on the other side in the longitudinal direction X.

A wiper blade 40 for wiping a wiping surface S (see FIG. 1) is connected to an end (tip end) of the arm piece 30 on the other side in the longitudinal direction X. The wiper blade 40 is formed in a long shape that extends in the longitudinal direction X. The wiping surface S is, for example, a windshield provided in front of a vehicle. The arm head 10 rotates around the pivot shaft 9, by which the wiper blade 40 wipes the wiping surface S.

In the following description, a direction along a normal line of the wiping surface S is defined as a vertical direction Y (third direction), and in the vertical direction Y, the side of the windshield wiper arm 1 viewed from the wiping surface S is the upper side. In addition, a direction orthogonal to the vertical direction Y and the longitudinal direction X is defined as a wiping direction Z (second direction) of the wiper blade 40.

A washer nozzle 50 for spraying a washer fluid to the wiping surface S is mounted on the arm piece 30 on the base end side with respect to a portion connected to the wiper blade 40. A hose 60 for supplying the washer fluid to the washer nozzle 50 is connected to the washer nozzle 50. The hose 60 is arranged along the arm piece 30.

As shown in FIG. 6 to FIG. 10, the washer nozzle 50 is L-shaped in a side view and is formed in a rectangular shape in a front view and a plan view. The washer nozzle 50 is formed by injection molding of a synthetic resin material, for example. The washer nozzle 50 is formed with a fitting groove 51 into which the arm piece 30 is fitted and which extends along the longitudinal direction X.

The fitting groove 51 extends over the entire area of the washer nozzle 50 and is open toward both sides in the longitudinal direction X and one side in the wiping direction Z. The fitting groove 51 has a rectangular shape in a side view viewed from the longitudinal direction X. A size of the fitting groove 51 in the vertical direction Y is equal to a size of the arm piece 30 in the vertical direction Y.

Figure 7:
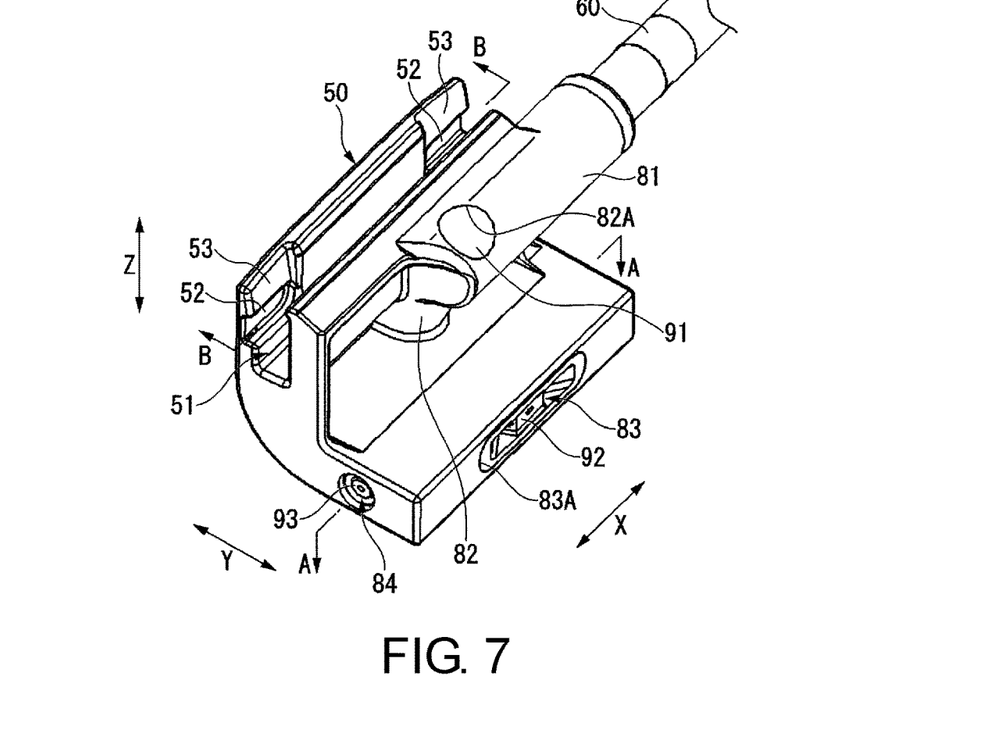
FIG. 7 is an enlarged view of the washer nozzle shown in FIG. 6.
Figure 8:
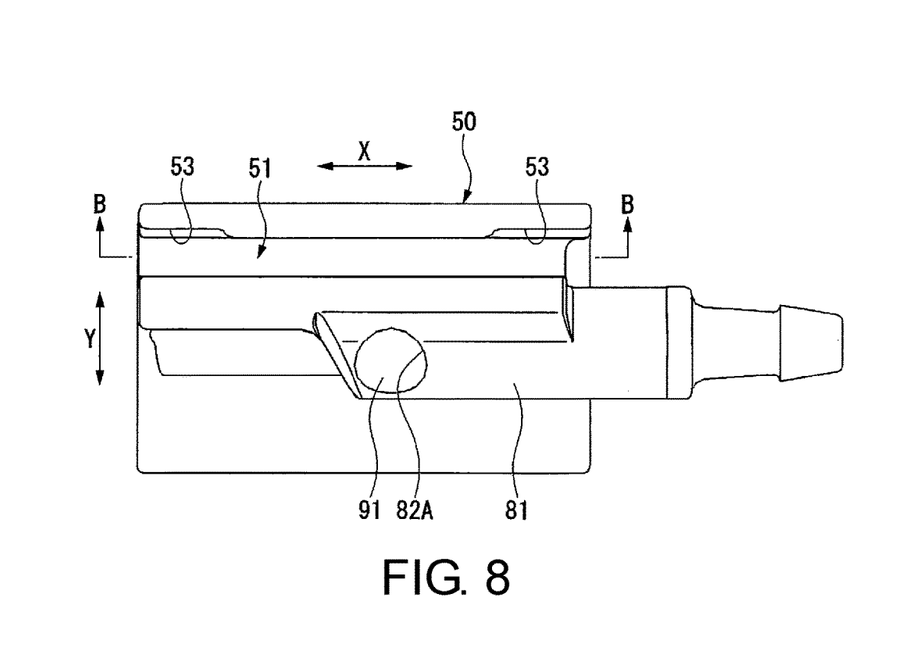
FIG. 8 is a top view of the washer nozzle shown in FIG. 7.
Figure 9:
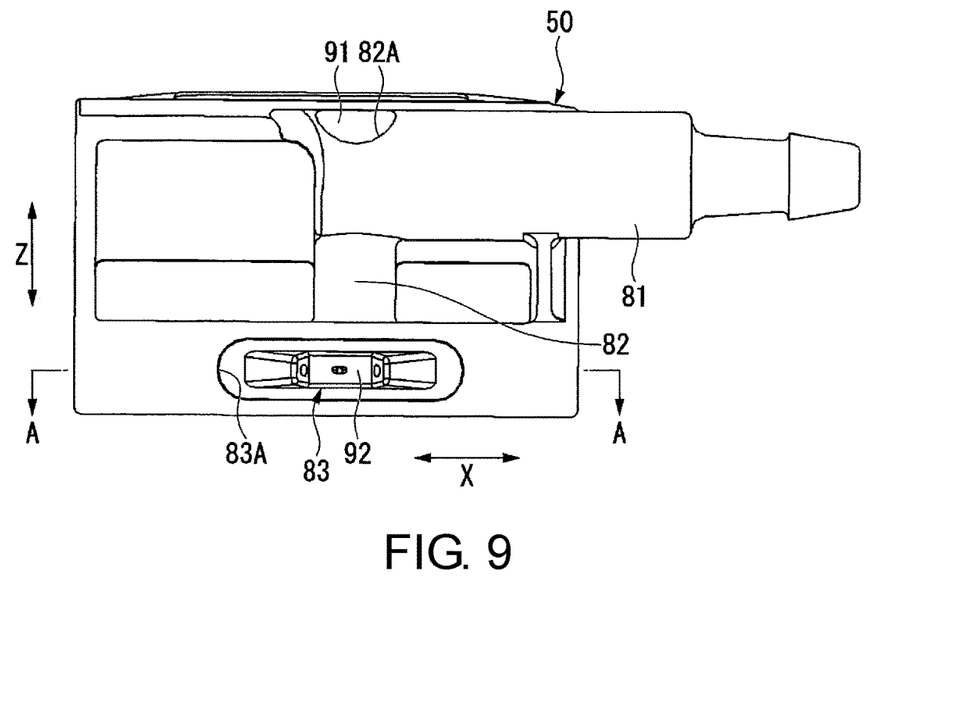
FIG. 9 is a rear view of the washer nozzle shown in FIG. 7.
Figure 12:
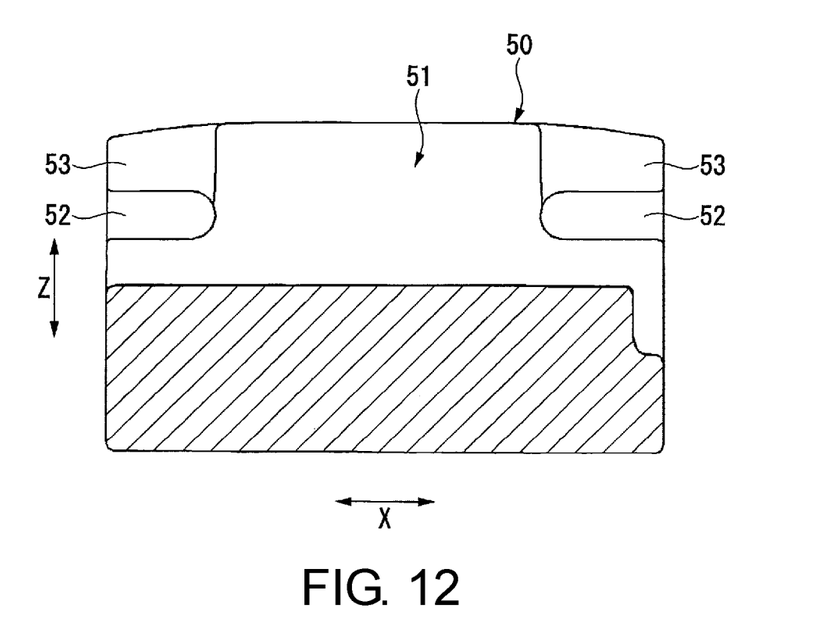
FIG. 12 is a cross-sectional view taken along the line B-B shown in FIG. 7 and FIG. 8.

As shown in FIG. 7, a recess 52 which is recessed in the vertical direction Y is formed on an inner surface of the fitting groove 51. More specifically, the recess 52 is recessed toward the upper side in the vertical direction Y. The recesses 52 are individually formed at both ends in the longitudinal direction X on the inner surface of the fitting groove 51 and are open in the longitudinal direction X. As shown in FIG. 12, the recess 52 has a rectangular shape that extends in the longitudinal direction X in a cross-sectional view viewed from the vertical direction Y, and an inner end of the recess 52 in the longitudinal direction X is formed in a curved shape that protrudes toward the inner side in the longitudinal direction X.

Figure 10:
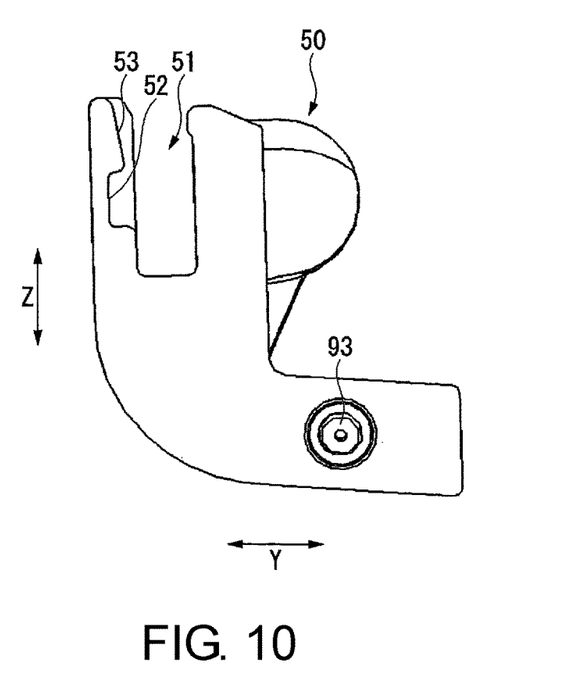
FIG. 10 is a side view of the washer nozzle shown in FIG. 7.
Figure 11:
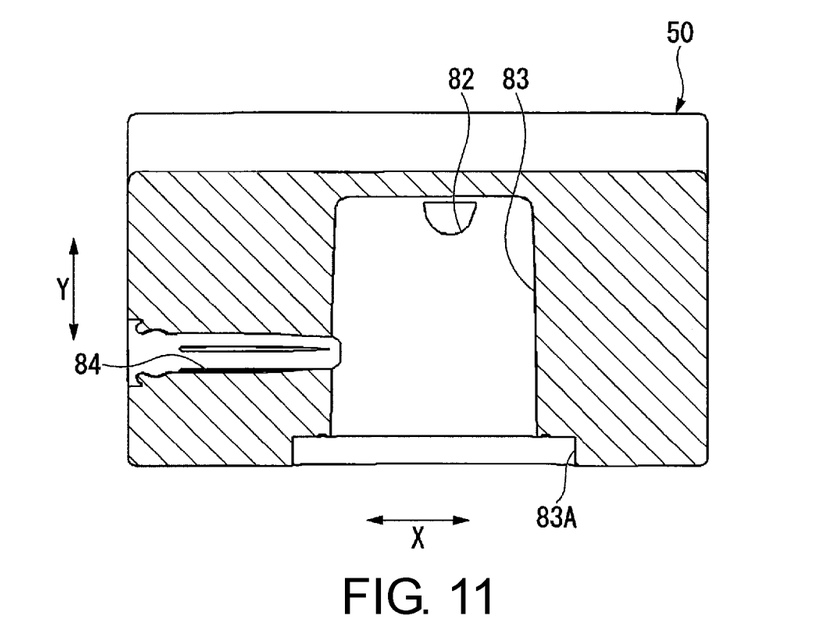
FIG. 11 is a cross-sectional view taken along the line A-A shown in FIG. 7 and FIG. 9.

As shown in FIG. 10 and FIG. 12, on the inner surface of the fitting groove 51, an inclined surface 53 is formed on a portion adjacent to the recess 52 and one side in the wiping direction Z. The inclined surface 53 gradually inclines toward the upper side in the vertical direction Y as it extends toward one side in the wiping direction Z. A pair of inclined surfaces 53 are provided corresponding to a pair of recesses 52. A connection portion between the recess 52 and the inclined surface 53 is located above the inner surface of the fitting groove 51 in the vertical direction Y.

Figure 13:
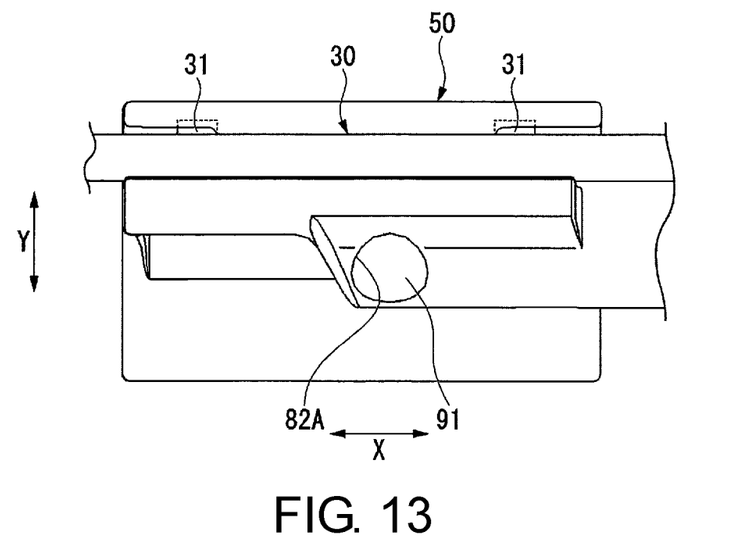
FIG. 13 is a view showing a state where an arm piece is attached to the washer nozzle shown in FIG. 8.
Figure 14:
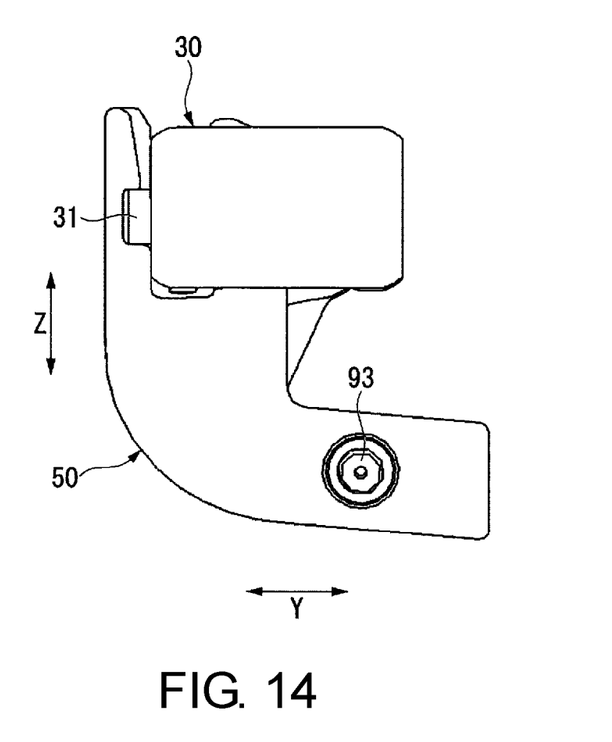
FIG. 14 is a view showing a state where the arm piece is attached to the washer nozzle shown in FIG. 10.

Then, as shown in FIG. 13 and FIG. 14, a protrusion 31 is formed on an outer surface of the arm piece 30. The protrusion 31 protrudes in the vertical direction Y and is fitted into the recess 52. More specifically, the protrusion 31 protrudes toward the upper side in the vertical direction Y. A pair of protrusions 31 are arranged at an interval in the longitudinal direction. The protrusion 31 has a circular shape in a plan view viewed from the vertical direction Y and is arranged at the inner end of the recess 52 in the longitudinal direction X.

As shown in FIG. 9 to FIG. 12, a first flowpath 81, a second flowpath 82, and a third flowpath 83 are formed in the washer nozzle 50. The first flowpath 81 extends in the longitudinal direction X. The second flowpath 82 is connected to the first flowpath 81 and extends in the wiping direction Z. The third flowpath 83 is connected to the second flowpath 82 and extends in the vertical direction Y. The second flowpath 82 includes a first opening 82A that is open toward a side opposite to the third flowpath 83 in the wiping direction Z. A closure cap 91 is mounted on the first opening 82A. The third flowpath 83 includes a second opening 83A that is open toward the side of the wiping surface S. A first spray nozzle 92 is mounted on the second opening 83A. At the spray ports of the first spray nozzle 92, the flowpath is branched in a plurality of directions.

For example, the spray ports of the first spray nozzle 92 include a spray port for spraying the washer fluid along the vertical direction Y, and a spray port for spraying the washer fluid in a direction slightly inclined toward the longitudinal direction X with respect to the vertical direction Y. Thus, the second flowpath 82 can be easily formed by simply pulling out a core mold toward the side opposite to the third flowpath 83 in the wiping direction Z. In addition, the third flowpath 83 can be easily formed by simply pulling out a core mold toward the lower side in the vertical direction Y, and the spray range of the washer fluid is expanded by the first spray nozzle 92.

A fourth flowpath 84 that extends in the longitudinal direction X is formed in an intermediate portion of the third flowpath 83 in the vertical direction Y. The fourth flowpath 84 is open toward the tip end side of the arm piece 30 in the longitudinal direction X and forms a spray port. A second spray nozzle 93 is mounted on the spray port. Thus, the washer fluid is branched and sprayed from the first spray nozzle 92 and the second spray nozzle 93 in a plurality of directions.

Figure 15:
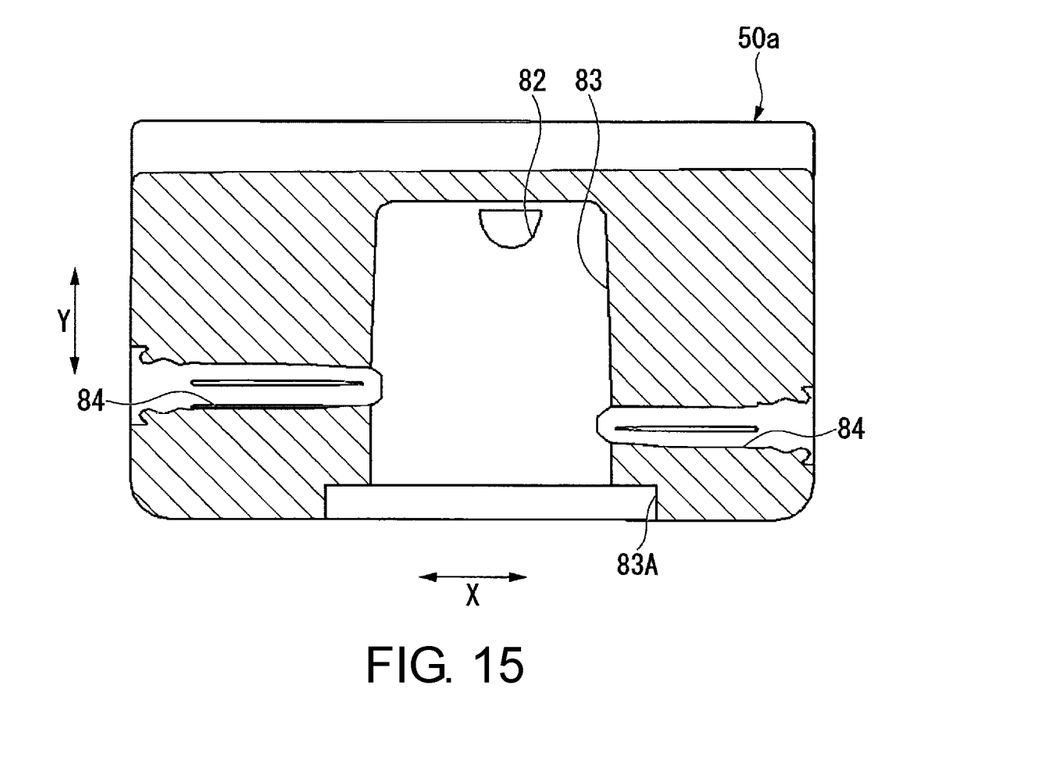
FIG. 15 is a view showing a modified example of the washer nozzle shown in FIG. 11.
Figure 16:
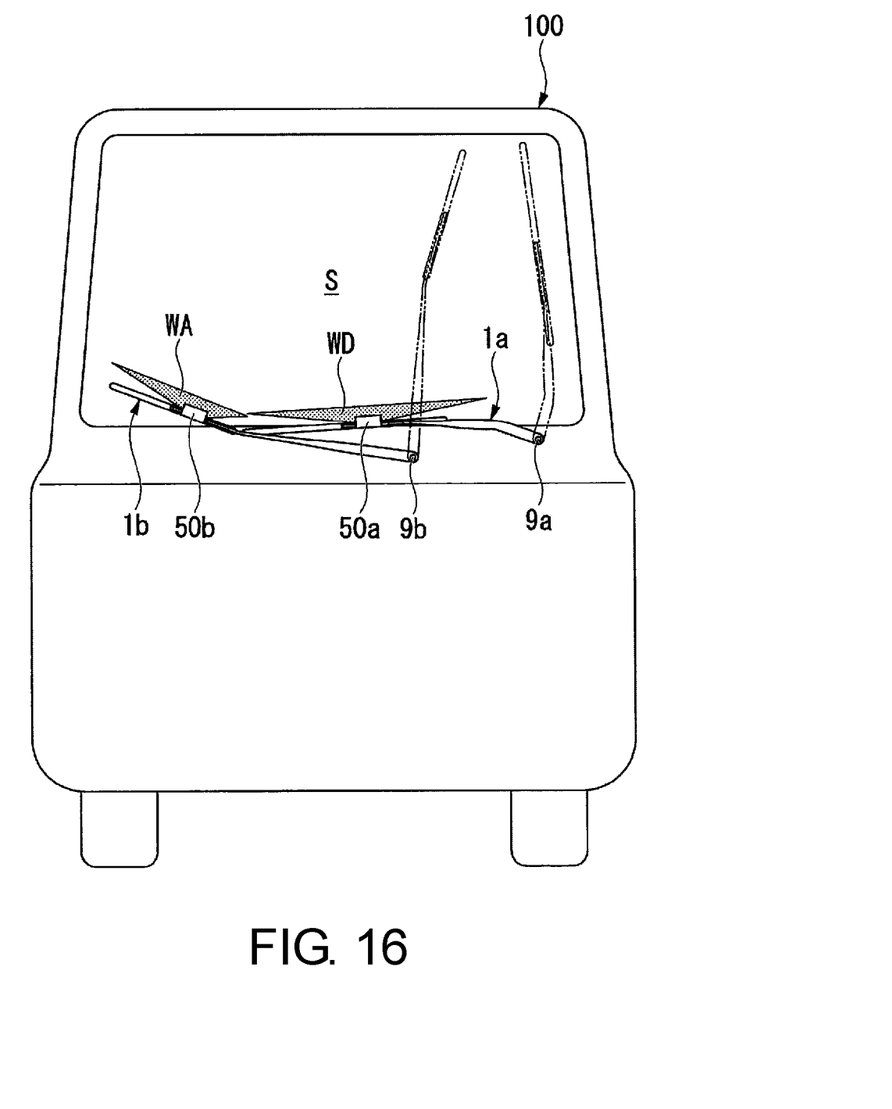
FIG. 16 is a view showing a state where a washer fluid is sprayed from the windshield wiper arm shown in FIG. 1.

As in the modified example shown in FIG. 15, the fourth flowpath 84 may be open toward both sides in the longitudinal direction X to form a spray port. For example, as shown in FIG. 16, the fourth flowpath 84 may be formed in a washer nozzle 50a mounted on the DR side windshield wiper arm 1a to be open toward both sides in the longitudinal direction X, and the fourth flowpath 84 may be formed in a washer nozzle 50b mounted on the AS side windshield wiper arm 1b to be open toward one side in the longitudinal direction X. With such a configuration, the spray range WD of the washer fluid of the DR side windshield wiper arm 1a and the spray range WA of the washer fluid of the AS side windshield wiper arm 1b do not overlap. Therefore, it is possible to prevent spraying the washer fluid excessively and reduce the usage amount of the washer fluid.

Here, both the pair of recesses 52 and the pair of fourth flowpaths 84 of the washer nozzle 50a are open toward both sides in the longitudinal direction X. Therefore, the recess 52 and the fourth flowpath 84 that are open toward the tip end side of the arm piece 30 can be formed by pulling out one core mold in one direction. Similarly, the recess 52 and the fourth flowpath 84 that are open toward the side of the shank 20 can also be formed by pulling out one core mold in one direction. In addition, regarding the washer nozzle 50b (see the washer nozzle 50 in FIG. 11), the recess 52 and the fourth flowpath 84 that are open toward the tip end side of the arm piece 30 can also be formed by pulling out one core mold in one direction.

Next, a procedure of attaching the arm piece 30 will be described with reference to FIG. 10, FIG. 13, and FIG. 14. The arm piece 30 is attached to the fitting groove 51 of the washer nozzle 50 shown in FIG. 10 from one side toward the other side in the wiping direction Z. At this time, the protrusion 31 of the arm piece 30 comes into contact with the inclined surface 53 of the fitting groove 51 and presses the inclined surface 53 toward the upper side in the vertical direction Y so as to enter the recess 52 while elastically expanding the fitting groove 51 in the vertical direction Y. As a result, the fitting groove 51 is elastically restored, and the recess 52 and the protrusion 31 are engaged with each other in the wiping direction Z, so that the arm piece 30 is fixed in the fitting groove 51. As described above, since the fitting groove 51 is not open to a design surface of the washer nozzle 50, that is, the end surface on the upper side in the vertical direction Y, the protrusion 31 is not exposed on the design surface of the washer nozzle 50. Thus, the appearance of the windshield wiper arm 1 is improved, and it is not required to perform painting after assembling the washer nozzle 50 or take rust countermeasures for the protrusion 31.

As described above, the first flowpath 81, the second flowpath 82, and the third flowpath 83 are formed in the washer nozzle 50, and these flowpaths as a whole extend three-dimensionally. Further, the fitting groove 51 which extends in the same direction as the first flowpath 81 and into which the arm piece 30 is fitted is formed in the washer nozzle 50.

Therefore, when the arm piece 30 is fitted into the fitting groove 51, it is possible to arrange the hose 60 connected to the washer nozzle 50 to overlap with respect to the arm piece 30 in the wiping direction Z that intersects the longitudinal direction X. Thus, the entire windshield wiper arm 1 can be prevented from becoming bulky in the vertical direction Y that intersects the longitudinal direction X and the wiping direction Z respectively, and the appearance can be improved.

In addition, since the second flowpath 82 includes the first opening 82A, the second flowpath 82 can be easily formed. Further, since the third flowpath 83 includes the second opening 83A, the third flowpath 83 can be easily formed. Furthermore, since the first spray nozzle 92 is mounted on the second opening 83A, the spray direction of the washer fluid from the washer nozzle 50 can be adjusted as desired.

Further, by fitting the protrusion 31 formed on the outer surface of the arm piece 30 into the recess 52 formed on the inner surface of the fitting groove 51, the arm piece 30 can be tightly fitted into the fitting groove 51. In addition, the washer nozzle 50 can be easily formed at low cost. Moreover, since the recess 52 of the fitting groove 51 is open in the longitudinal direction X, by setting the pulling direction of the core mold to the longitudinal direction X for forming the fitting groove 51, the recess 52 can be easily formed on the inner surface of the fitting groove 51.

Nevertheless, the technical scope of the invention is not limited to the above-described embodiment, and various modifications can be made without departing from the spirit of the invention.

For example, the above-described embodiment illustrates a configuration in which the second flowpath 82 includes the first opening 82A, and the closure cap 91 is mounted on the first opening 82A. However, the invention is not limited to such a configuration. The second flowpath 82 may not include the first opening 82A. Moreover, the above-described embodiment illustrates a configuration in which the third flowpath 83 includes the second opening 83A that is open toward the wiping surface S. However, the invention is not limited to such a configuration. The third flowpath 83 may not include the second opening 83A.

Further, the above-described embodiment illustrates a configuration in which the recess 52 is formed on the inner surface of the fitting groove 51, and the protrusion 31 that is fitted into the recess 52 is formed on the outer surface of the arm piece 30. However, the invention is not limited to such a configuration. The recess 52 may not be formed on the inner surface of the fitting groove 51, and the protrusion 31 may not be formed on the outer surface of the arm piece 30.

In addition, the above-described embodiment illustrates a configuration in which the washer nozzle 50 is formed of a synthetic resin material, and the recess 52 of the fitting groove 51 is open in the longitudinal direction X. However, the invention is not limited to such a configuration. The washer nozzle 50 may be formed of other materials such as a metal material, and the recess 52 may not be open in the longitudinal direction X.

It is possible to appropriately replace the components in the above-described embodiment with known components without departing from the spirit of the invention, and it is also possible to appropriately combine the above-described modified examples.

What is claimed is:

1. A windshield wiper arm, comprising:
    an arm piece which has a tip end, to which a wiper blade that wipes a wiping surface is connected, and extends in a first direction;
    a hose to which a washer fluid is supplied and which is arranged along the arm piece; and
    a washer nozzle which is connected to the hose and mounted on the arm piece on a base end side with respect to a portion connected to the wiper blade,
    wherein the washer nozzle comprises:
    a first flowpath which extends in the first direction;
    a second flowpath which is connected to the first flowpath and extends in a second direction, which intersects the first direction and in which the wiper blade is movable when wiping the wiping surface;
    a third flowpath which is connected to the second flowpath and extends in a third direction, which intersects the first direction and the second direction respectively and is along a normal line of the wiping surface; and
    a fitting groove into which the arm piece is fitted and which extends along the first direction.

2. The windshield wiper arm according to claim 1, wherein the second flowpath comprises a first opening that is open toward a side opposite to the third flowpath in the second direction,
    a closure cap is mounted on the first opening, and
    the third flowpath comprises a second opening that is open toward a wiping surface side.

3. The windshield wiper arm according to claim 2, wherein a recess which is recessed in the third direction is formed on an inner surface of the fitting groove, and
    a protrusion which protrudes in the third direction and is fitted into the recess is formed on an outer surface of the arm piece.

4. The windshield wiper arm according to claim 3, wherein the washer nozzle is formed by injection molding of a synthetic resin material, and
    the recess is open in the first direction.

5. The windshield wiper arm according to claim 1, wherein a recess which is recessed in the third direction is formed on an inner surface of the fitting groove, and
    a protrusion which protrudes in the third direction and is fitted into the recess is formed on an outer surface of the arm piece.

6. The windshield wiper arm according to claim 5, wherein the washer nozzle is formed by injection molding of a synthetic resin material, and
    the recess is open in the first direction.

* * * * *